United States Patent
Chin et al.

(10) Patent No.: US 12,149,924 B2
(45) Date of Patent: Nov. 19, 2024

(54) MEASUREMENT DISABLING IN FREQUENCY RANGES

(71) Applicant: QUALCOMM Incorporated, San Diego, CA (US)

(72) Inventors: Tom Chin, San Diego, CA (US); Rajeev Pal, San Diego, CA (US); Kuo-Chun Lee, San Diego, CA (US); Arvind Vardarajan Santhanam, San Diego, CA (US); Wei-Jei Song, San Diego, CA (US); Abhishek Bhatnagar, San Diego, CA (US); Min Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 527 days.

(21) Appl. No.: 17/450,275

(22) Filed: Oct. 7, 2021

(65) Prior Publication Data
US 2022/0167226 A1    May 26, 2022

Related U.S. Application Data

(60) Provisional application No. 63/116,609, filed on Nov. 20, 2020.

(51) Int. Cl.
*H04W 36/00* (2009.01)
*H04W 72/0453* (2023.01)
*H04W 84/04* (2009.01)

(52) U.S. Cl.
CPC .. *H04W 72/0453* (2013.01); *H04W 36/00226* (2023.05); *H04W 36/00698* (2023.05); *H04W 36/00837* (2018.08); *H04W 84/042* (2013.01)

(58) Field of Classification Search
CPC ............. H04W 36/0088; H04W 36/30; H04W 72/0453; H04W 84/042; H04W 36/08;
(Continued)

(56) References Cited

U.S. PATENT DOCUMENTS

2015/0208353 A1*  7/2015 Jung ................. H04W 52/0254
                                                        455/574
2019/0335446 A1* 10/2019 Guha .................... H04W 72/21
(Continued)

FOREIGN PATENT DOCUMENTS

WO    2020/046683 A1    3/2020
WO    2020/067763 A1    4/2020
(Continued)

OTHER PUBLICATIONS

International Search Report and Written Opinion dated Feb. 9, 2022 from corresponding PCT Application No. PCT/US2021/054182.
(Continued)

*Primary Examiner* — Allahyar Kasraian
(74) *Attorney, Agent, or Firm* — QUALCOMM Incorporated

(57) ABSTRACT

Aspects are provided which allow a UE to disable measurements of reference signals from 5G base stations which are inapplicable to EN-DC. The UE may receive a reference signal from a base station. The UE may identify a frequency range. The UE may determine whether to measure the reference signal based on whether the reference signal is within the identified frequency range. The UE may refrain from measuring the reference signal in response to the determination. The UE may also refrain from measuring the reference signal in response to a SIB received at the UE not including a ULI, or in response to a frequency associated with the reference signal not being in a list of supported bands for EN-DC. As a result, inter-RAT handovers from LTE base stations to 5G base stations are prevented, UE power consumption is thereby saved, and support for EN-DC is maintained.

28 Claims, 6 Drawing Sheets

(58) Field of Classification Search
CPC ....... H04W 36/00698; H04W 36/0069; H04W 36/0058; H04W 36/0061; H04W 36/0072
See application file for complete search history.

(56) References Cited

U.S. PATENT DOCUMENTS

| | | | |
|---|---|---|---|
| 2020/0100181 A1 | 3/2020 | Jia et al. | |
| 2020/0344694 A1 | 10/2020 | Jangid et al. | |
| 2020/0396656 A1* | 12/2020 | Yang | H04W 36/0058 |
| 2021/0352542 A1* | 11/2021 | Chang | H04W 36/00837 |
| 2022/0015029 A1* | 1/2022 | Wang | H04W 36/00835 |
| 2022/0217734 A1* | 7/2022 | Chen | H04B 7/0695 |
| 2023/0308250 A1* | 9/2023 | Wu | H04W 48/16 |

FOREIGN PATENT DOCUMENTS

| | | |
|---|---|---|
| WO | 2020/068410 A1 | 4/2020 |
| WO | 2020/222211 A1 | 11/2020 |
| WO | 2021/126798 A1 | 6/2021 |

OTHER PUBLICATIONS

Jangid Alok Kumar et al.: "Efficient Protocol for EUTRA New Radio Dual Connectivity Handling based on Location", 2020 IEEE 3rd 5G World Forum (5GWF), IEEE, Sep. 10, 2020 (Sep. 10, 2020), pp. 103-108, XP033840459, DOI: 10.1109/5GWF49715.2020.9221272 [retrieved on Oct. 12, 2020].

* cited by examiner

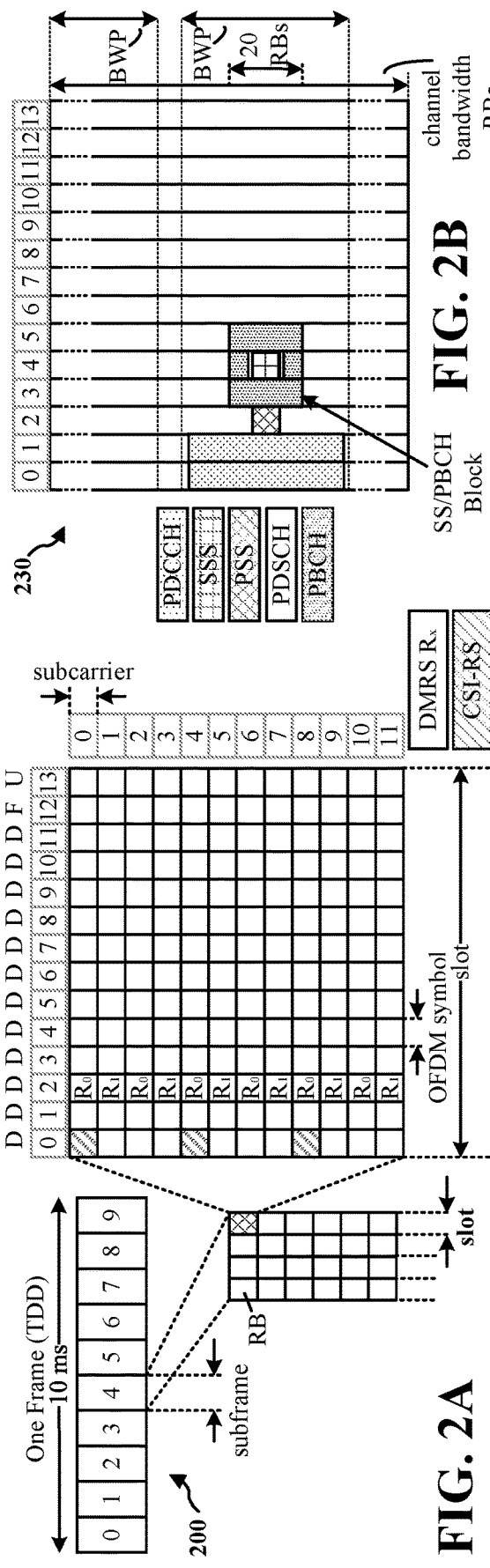
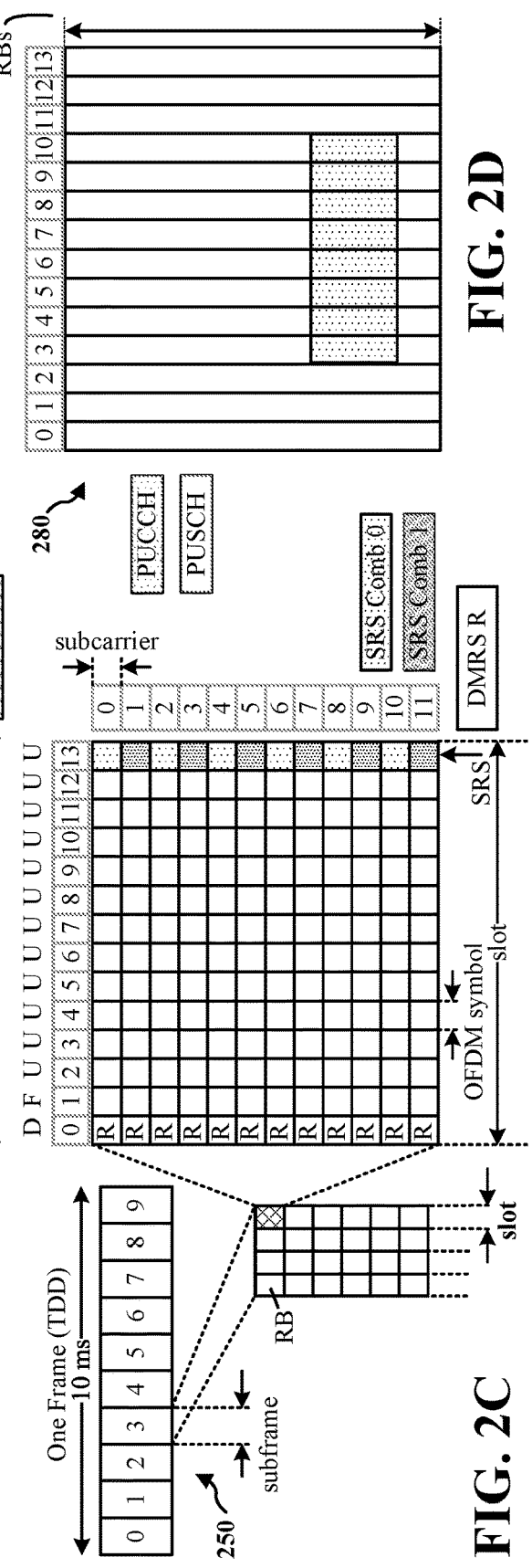
FIG. 2A  FIG. 2B  FIG. 2C  FIG. 2D

MEASUREMENT DISABLING IN
FREQUENCY RANGES

CROSS REFERENCE TO RELATED
APPLICATION(S)

This application claims the benefit of U.S. Provisional Application Ser. No. 63/116,609, entitled "MEASUREMENT DISABLING IN FREQUENCY RANGES" and filed on Nov. 20, 2020, the disclosure of which is expressly incorporated by reference herein in its entirety.

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives a reference signal from a base station, identifies a frequency range, and determines whether to measure the reference signal based on whether the reference signal is within the identified frequency range.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
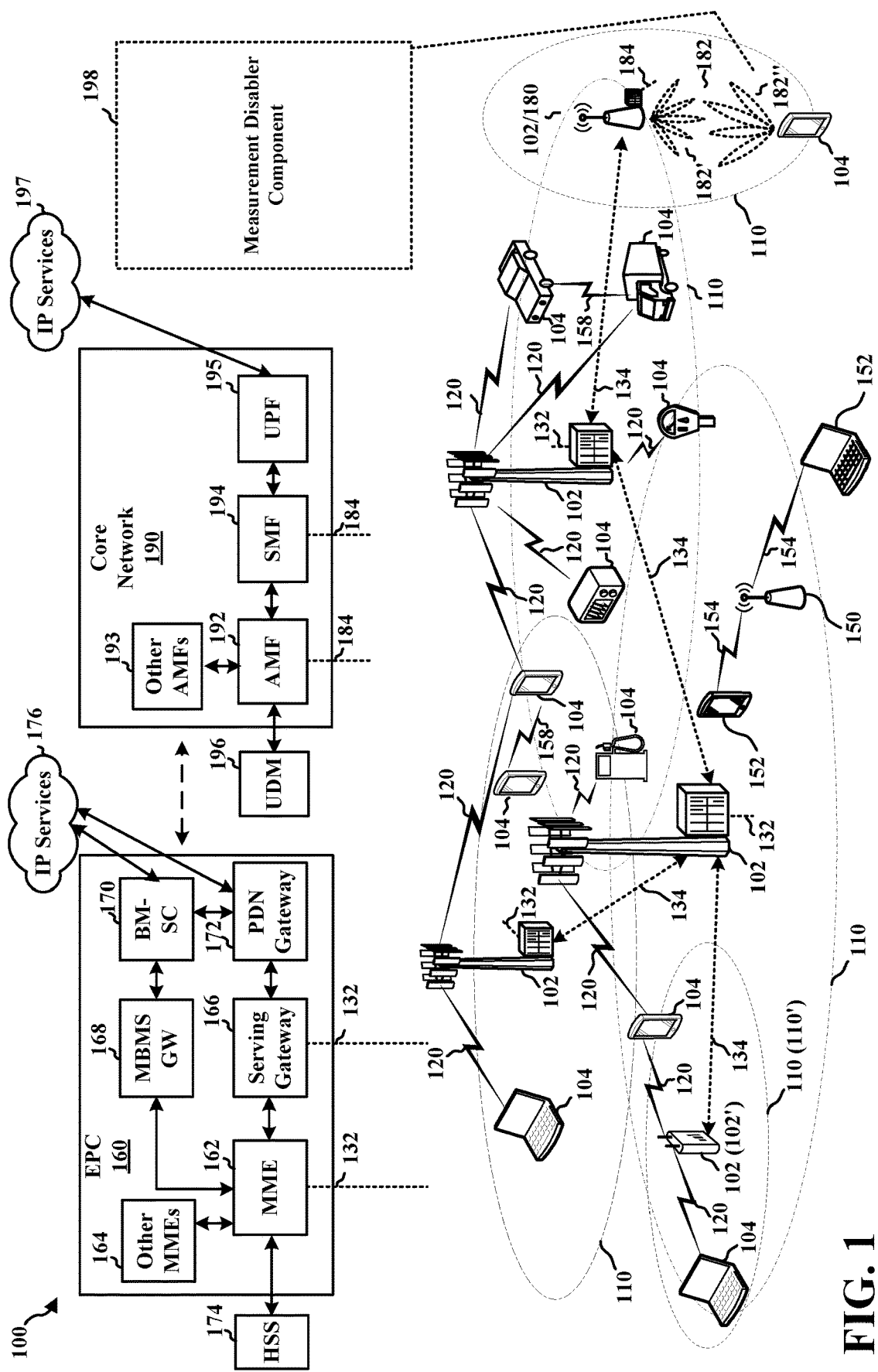
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In NR, base stations may operate in a standalone (SA) deployment (e.g. the base station may be a 5G SA base station) or a non-standalone (NSA) deployment (e.g. the base station may be a 5G NSA base station). A 5G SA base station refers to a base station that is directly connected to a core network and may receive and transmit control plane data to the UE. A 5G NSA base station refers to a base station that is connected to another base station, which in turn, is connected to a different RAT network and which receives and transmits control plane data to the UE. For example, in NSA, control signaling of 5G may be anchored to a 4G base station, while in SA, a 5G base station may be directly connected to a 5G core network without depending on the 4G network for control signaling.

5G base stations (SA and NSA) may provide decreased latency, increased traffic capacity, and increased data throughput to UEs in comparison to 4G/LTE base stations. However, the UE may experience higher power consumption in 5G deployments than in LTE deployments, especially when communicating with 5G SA base stations. Moreover, when a UE is connected to an LTE base station, in some cases the UE may be triggered to handover to a 5G base station in response to a handover command. As a result, increased power consumption at the UE may occur following an inter-radio access technology (inter-RAT) handover from LTE to NR.

Accordingly, it would be helpful to reduce power consumption at the UE by preventing inter-RAT handovers to 5G base stations from occurring. For instance, it would be helpful to limit handovers to 5G SA base stations operating in a sub-6 GHz frequency range (FR1, e.g., 410 MHz-7.125 GHz) or in a mmW frequency range (FR2, e.g., 24.25 GHz-52.6 GHz), where power consumption at the UE may be significant. Additionally, ultra-high frequency bands above 52.6 GHz may also be defined in different frequency ranges (e.g. FR3, FR4, FR5, FR6, etc., in increasing order of frequencies), and therefore it would similarly be helpful to limit inter-RAT handovers to 5G base stations in these frequency ranges as well.

To prevent such LTE-NR handovers from occurring in a given frequency range (e.g. FR1, FR2, FR3, etc.), the UE may prune measurement frequencies of reference signals that are received from a 5G base station within the given frequency range. For example, the UE may identify (e.g. from a modem control interface command) that reference signal measurements are to be pruned for frequencies within a given frequency range FR1. In such case, the UE may refrain from measuring reference signal receive power (RSRP), reference signal receive quality (RSRQ), or signal to interference noise ratios (SINR) of reference signals carried in frequencies within FR1. The UE may similarly refrain from measuring reference signals from 5G base stations which are carried in FR2 frequencies or in other given frequency ranges. As a result, when the UE is connected to an LTE base station in a source cell, the UE may refrain from measuring reference signals within a given frequency range from a 5G base station in a neighbor cell. Moreover, the UE may prune measurement frequencies of reference signals based on whether the UE is in an idle/inactive mode or a connected mode, or based on whether the 5G base station is SA or NSA. Thus, by disabling these measurements corresponding to the neighbor cell, the UE may not send a measurement report to the LTE base station, which in turn prevents the LTE base station from triggering a handover to the 5G base station. As a result, the UE may remain connected to the LTE base station rather than switch to the 5G base station, thereby saving UE power consumption.

However, in some cases, reference signals from a 5G base station may be applicable to Evolved-Universal Terrestrial Radio Access (EUTRA) New Radio (NR) Dual Connectivity (EN-DC). For example, the UE may be connected to an LTE base station and a 5G base station in EN-DC, and the reference signals may be received from the 5G base station. To avoid pruning measurement frequencies of such reference signals and impacting EN-DC communication, the UE may determine whether or not the reference signals received from a 5G base station are applicable to EN-DC. For example, the UE may check whether the UE has received system information indicating whether EN-DC is supported (e.g. an upper layer indication (ULI) bit in one system information block SIB2), or the UE may check whether the UE has received system information indicating a list of supported bands for EN-DC (e.g. in another system information block SIB26a). If the UE determines that the ULI bit is not received (or false) or that the reference signals received from the 5G base station are not within the list of EN-DC supported bands, the UE may conclude that the reference signals are not applicable to EN-DC, and thus the UE may prune the measurement frequencies of the reference signals to minimize LTE-NR handovers as described above.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a measurement disabler component 198 that is configured to receive a reference signal from a base station, identify a frequency range, and determine whether to measure the reference signal based on whether the reference signal is within the identified frequency range.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
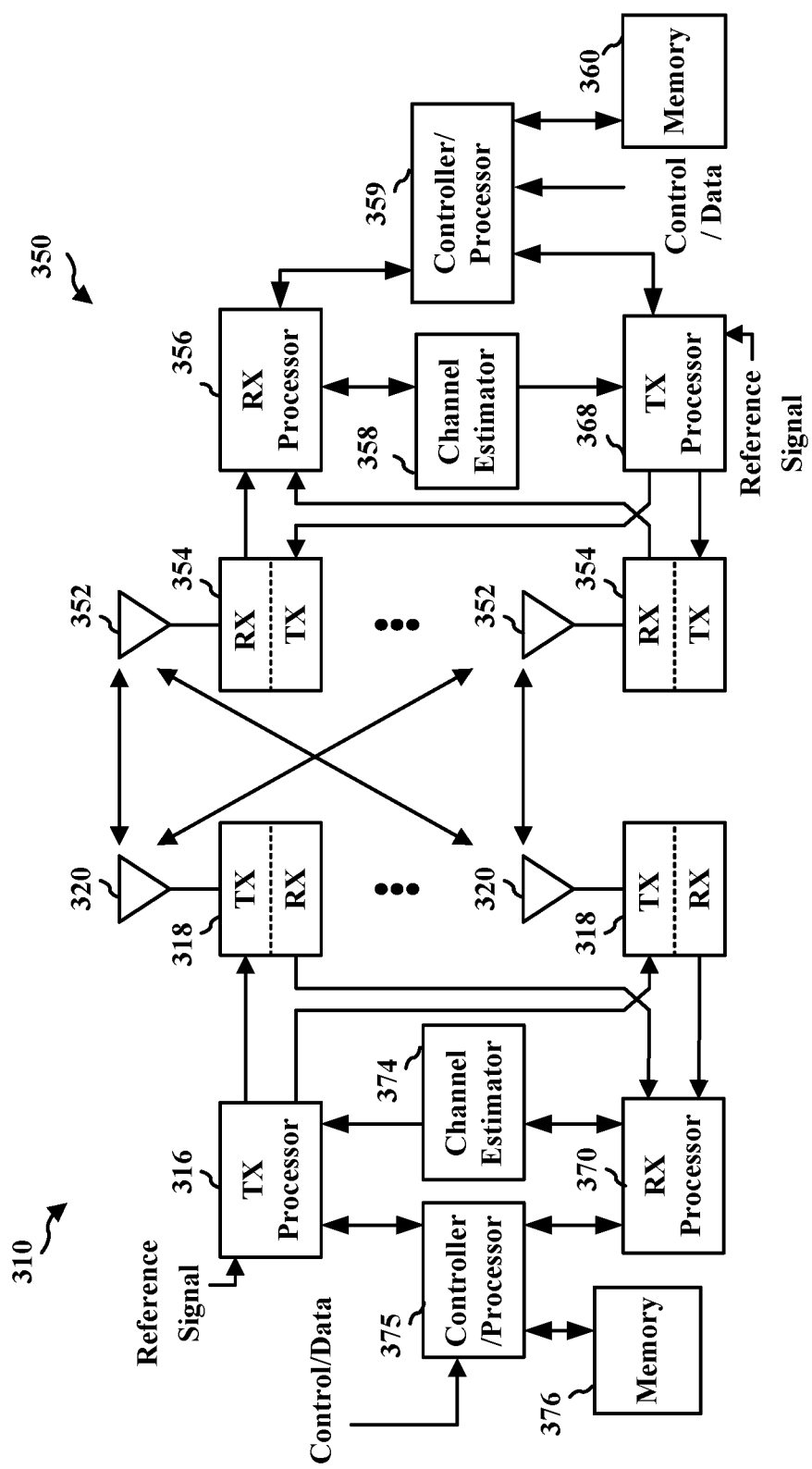
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with measurement disabler component 198 of FIG. 1.

In NR, base stations may operate in an SA deployment (e.g. the base station may be a 5G SA base station) or a NSA deployment (e.g. the base station may be a 5G NSA base station). A 5G SA base station refers to a base station (gNB) that is directly connected to a core network (e.g. core network 190) and may receive and transmit control plane data to the UE. A 5G NSA base station refers to a base station (gNB) that is connected to another base station (eNB), which in turn, is connected to a different RAT network (e.g. EPC 160) and which receives and transmits control plane data to the UE. For example, in NSA, control signaling of 5G may be anchored to a 4G base station, while in SA, a 5G base station may be directly connected to a 5G core network without depending on the 4G network for control signaling.

5G base stations (SA and NSA) may provide decreased latency, increased traffic capacity, and increased data throughput to UEs in comparison to 4G/LTE base stations. However, the UE may experience higher power consumption in 5G deployments than in LTE deployments, especially when communicating with 5G SA base stations. Moreover, when a UE is connected to an LTE base station, in some cases the UE may be triggered to handover to a 5G base station in response to a handover command (e.g. when a RSRP of a 5G neighbor cell is greater than a threshold). As a result, increased power consumption at the UE may occur following an inter-RAT handover from LTE to NR.

Accordingly, it would be helpful to reduce power consumption at the UE by preventing inter-RAT handovers to 5G base stations from occurring. For instance, it would be helpful to limit handovers to 5G SA base stations operating in a sub-6 GHz frequency range (FR1) or in a mmW frequency range (FR2), where power consumption at the UE may be significant. Additionally, ultra-high frequency bands above 52.6 GHz may also be defined in different frequency ranges (e.g. FR3, FR4, FR5, FR6, etc., in increasing order of frequencies), and therefore it would similarly be helpful to limit inter-RAT handovers to 5G base stations in these frequency ranges as well.

To prevent such LTE-NR handovers in a given frequency range (e.g. FR1, FR2, FR3, etc.) from occurring, the UE may prune measurement frequencies of reference signals that are received from a 5G base station within the given frequency range. For example, the UE may identify that reference signal measurements are to be pruned for frequencies within a given frequency range FR1, in response to which the UE may refrain from measuring RSRP, RSRQ, or SINR of reference signals carried in frequencies within FR1. The UE may similarly refrain from measuring reference signals from 5G base stations which are carried in FR2 frequencies or in other given frequency ranges. As a result, when the UE is connected to an LTE base station in a source cell, the UE may refrain from measuring reference signals carried in a given frequency range from a 5G base station in a neighbor cell. Without these measurements corresponding to the neighbor cell, the UE may not send a measurement report to the LTE base station, which in turn prevents the LTE base station from triggering a handover to the 5G base station. As a result, the UE may remain connected to the LTE base station rather than switch to the 5G base station, thereby saving UE power consumption.

Moreover, the UE may prune measurement frequencies of reference signals received from 5G base stations within a given frequency range (e.g. FR1, FR2, FR3, etc.) based on whether the UE is in an idle/inactive mode or a connected mode A UE is in an idle mode when the UE does not have an established RRC connection with the 5G base station (e.g. after powering up), a UE is in a connected mode when the UE has an established RRC connection with the 5G base station (e.g. after performing an RRC connection establishment procedure during initial access), and a UE is in an inactive mode when the UE has a suspended RRC connection with the 5G base station. When the UE receives reference signals carried in a given frequency range, the UE may refrain from measuring the reference signals only when the UE is in a connected mode, or when the UE is either in the connected mode or an idle/inactive mode. For example, when the UE is connected to an LTE base station in a source cell, the UE may refrain from measuring reference signals carried in FR1 frequencies from a 5G base station in a neighbor cell only when the UE has an established RRC connection with the 5G base station, or in some cases when the UE has no RRC connection or a suspended RRC connection with the 5G base station. Thus, the UE may only refrain from performing connected mode measurements, or refrain from performing both idle mode (or inactive mode) measurements and connected mode measurements, of reference signals carried in a given frequency range. Without these measurements corresponding to the neighbor cell, the UE may not send a measurement report to the LTE base station, which in turn prevents the LTE base station from triggering a handover to the 5G base station. As a result, the UE may remain connected to the LTE base station rather than switch to the 5G base station, similarly saving UE power consumption.

Furthermore, the UE may prune measurement frequencies of reference signals received from 5G base stations within a given frequency range (e.g. FR1, FR2, FR3, etc.) based on whether the 5G base station is a 5G SA base station or a 5G NSA base station. For example, the UE may refrain from measuring reference signals from a 5G base station carried in FR1 frequencies only when the 5G base station is stand-alone, or in some cases when the 5G base station is non-standalone (e.g. when the 5G base station is anchored to an LTE base station communicating with the UE). Thus, the UE may refrain from performing measurements only of reference signals from 5G SA base stations, or also from 5G NSA base stations. Without these measurements corresponding to the neighbor cell, the UE may not send a measurement report to the LTE base station, which in turn prevents the LTE base station from triggering a handover to the 5G base station. As a result, the UE may remain connected to the LTE base station rather than switch to the 5G base station, similarly saving UE power consumption.

The UE may identify a given frequency range (e.g. FR1, FR2, FR3, etc.) for pruning reference signal measurements, as well as the other above-described conditions (e.g. idle mode vs. connected mode measurements, and 5G SA vs. 5G NSA measurements), from a modem control interface command. For example, the UE may include an application processor (e.g. a processor supporting embedded device original equipment manufacturers (OEMs) or operator/developers of the UE) and a baseband processor (e.g. a modem) connected to the application processor over a modem control interface (e.g. a wired or wireless connection between the application processor and the modem). The application processor may provide the modem control interface command to the modem over the modem control interface in response to a trigger (e.g. user input, an activated software routine in response to a low UE battery, etc.). The command may indicate the frequency range(s) (e.g. FR1, FR2, FR3, etc.) to be pruned (or measurements disabled). The command may also indicate whether the UE is to refrain from performing idle mode (or inactive mode) measurements and connected mode measurements, or only to refrain from performing connected mode measurements. Moreover, the command may indicate whether the UE is to refrain from performing measurements only of reference signals from 5G SA base stations, or also from 5G NSA base stations. An example of a structure for the modem control interface command is shown below:

| PRUNE NR MEASUREMENT REQUEST: | |
|---|---|
| - Frequency range: | |
| * FR1 | BOOLEAN |
| * FR2 | BOOLEAN |
| * FR3 | BOOLEAN |
| * FR4 | BOOLEAN |
| * FR5 | BOOLEAN |
| * FR6 | BOOLEAN |
| - UE states: | |
| * Connected_mode | BOOLEAN |
| * Idle/Inactive_mode | BOOLEAN |
| - 5G mode: | |
| * SA_only | BOOLEAN |

For instance, the modem control interface command (the prune NR measurement request) may have the following configuration: FR1=true, FR2/3/4/5/6=false, Connected_mode=true, Idle/Inactive_mode=false, and SA_only=true. In such configuration, the UE may determine from the modem control interface command to refrain from performing measurements of reference signals received only from a 5G SA base station which are carried within FR1 frequencies and only when the UE is in a connected mode. On the other hand, the UE may continue to measure reference signals received from 5G NSA base stations in any frequency range, from 5G SA base stations carried in non-FR1 frequencies (e.g. FR2, FR3, etc.), or from 5G base stations while the UE is in the idle mode or inactive mode. In another example, the modem control interface command may have the following configuration: FR1/3/4/5/6=false, FR2=true, Connected_mode=false, Idle/Inactive_mode=true, and SA_only=false. In such configuration, the UE may determine from the modem control interface command to refrain from performing measurements of reference signals received from either 5G SA or 5G NSA base stations which are carried within FR2 frequencies and only when the UE is in an idle or inactive mode. On the other hand, the UE may continue to measure reference signals received from 5G SA or 5G NSA base stations and carried in non-FR2 frequencies (e.g. FR1, FR3, etc.), or while the UE is in the connected mode. Different combinations of the parameter values in the modem control interface command may be configured in other examples.

Additionally, the UE may support multi-radio dual connectivity (MR-DC). In MR-DC, two different nodes or base stations may provide resources and data to the UE, including a master node (MN) and a secondary node (SN). One type of MR-DC is EN-DC, in which the MN is an eNB (LTE) and the SN is a gNB (NR). Generally, in EN-DC, the eNB sends RRC messages to the UE, while the gNB sends data to the UE. Thus, when the UE is connected to a LTE base station in a connected mode, the UE may also receive data from a 5G NSA base station in EN-DC. As a result, if the UE prunes measurement frequencies in a given frequency range (e.g. FR1, FR2, FR3, etc.) from an 5G NSA base station as described above, performance may be impacted if the disabled reference signal measurements were actually applicable to EN-DC (as opposed to just LTE-NR handovers). In other words, pruning measurement frequencies to avoid LTE-NR handovers may inefficiently affect measurements for EN-DC communication.

To mitigate this inefficient pruning, the UE may determine whether or not the reference signals received from a 5G base station are applicable to EN-DC before pruning. For example, the UE may receive a system information block 2 (SIB2) from an LTE base station to which the UE is connected, which may include various system information such as access barring information, semi-static common channel configuration for random access, uplink frequency information, and Multicast Broadcast Single Frequency Network (MSBFN) configuration information. The SIB2 may include an upper layer indication (ULI) bit (e.g. in a parameter upperlayerIndication or another name). If the ULI is broadcast or set to true, the SIB2 indicates that the LTE cell is co-located with an NR cell and thus that EN-DC is supported. As a result, reference signals received from the 5G base station may be applicable to EN-DC. On the other hand, if the ULI is not broadcast in the SIB2 or set to false, the SIB2 indicates that EN-DC is not supported. As a result, reference signals received from the 5G base station may not be applicable to EN-DC. Moreover, in some cases the LTE base station may be shared by multiple Public Land Mobile Networks (PLMNs), in which case multiple ULI may be indicated in the SIB2 which are individually associated with different PLMN IDs. If the LTE base station is in a single PLMN, the ULI may be associated with a single PLMN ID.

Accordingly, when the UE receives the SIB2, the UE may check whether a ULI associated with a selected PLMN ID (e.g. a PLMN ID corresponding to the PLMN to which the UE is subscribed) exists in the SIB2 or is set to true. If so, the UE may determine that reference signals received from a 5G NSA base station may be applicable to EN-DC, and therefore the UE may not prune the measurement frequencies of those reference signals (i.e. the UE may measure the reference signals from the 5G NSA base station). As a result, disabling of measurements for EN-DC communication may be avoided. Alternatively, if the UE determines that the ULI associated with the selected PLMN ID does not exist in the SIB2 or is set to false, the UE may determine that reference signals received from the 5G NSA base station are not applicable to EN-DC, and thus the UE may prune the measurement frequencies of those reference signals based on the mobile control interface command as described above.

Furthermore, in some cases the LTE base station may broadcast a system information block 26*a* (SIB26*a*) which includes system information indicating a list of supported bands for EN-DC (e.g. nr-BandList or another name). The SIB26*a* may indicate that reference signals received from a 5G NSA base station over the indicated band list may be applicable to EN-DC. Moreover, if the LTE base station is in a single PLMN, the band list indicated in the SIB26*a* may be associated with a single PLMN ID, while if the LTE base station is in multiple PLMNs, then multiple band lists may be indicated in the SIB26*a* which are individually associated with different PLMN IDs.

Accordingly, the UE may determine whether a SIB26*a* is received including a list of EN-DC supported bands associated with a selected PLMN ID (e.g. a PLMN ID corresponding to the PLMN to which the UE is subscribed). In such case, the UE may determine not to prune the measurement frequencies of reference signals received from a 5G NSA base station which are carried over the specified frequency bands in the list of supported bands. That is, the UE may identify any reference signals from the 5G base station which are received in these bands as being applicable to EN-DC, and therefore the UE may continue to measure these reference signals. As a result, disabling of measurements for EN-DC communication may be avoided. On the other hand, the UE may determine to prune the measurement frequencies of reference signals received from the 5G NSA base station which are carried over other frequency bands than those in the list of supported bands. That is, the UE may identify any reference signals from the 5G base station which are not received in these bands as not being applicable to EN-DC, and therefore the UE may prune the measurement frequencies of those reference signals based on the mobile control interface command as described above.

Figure 4:
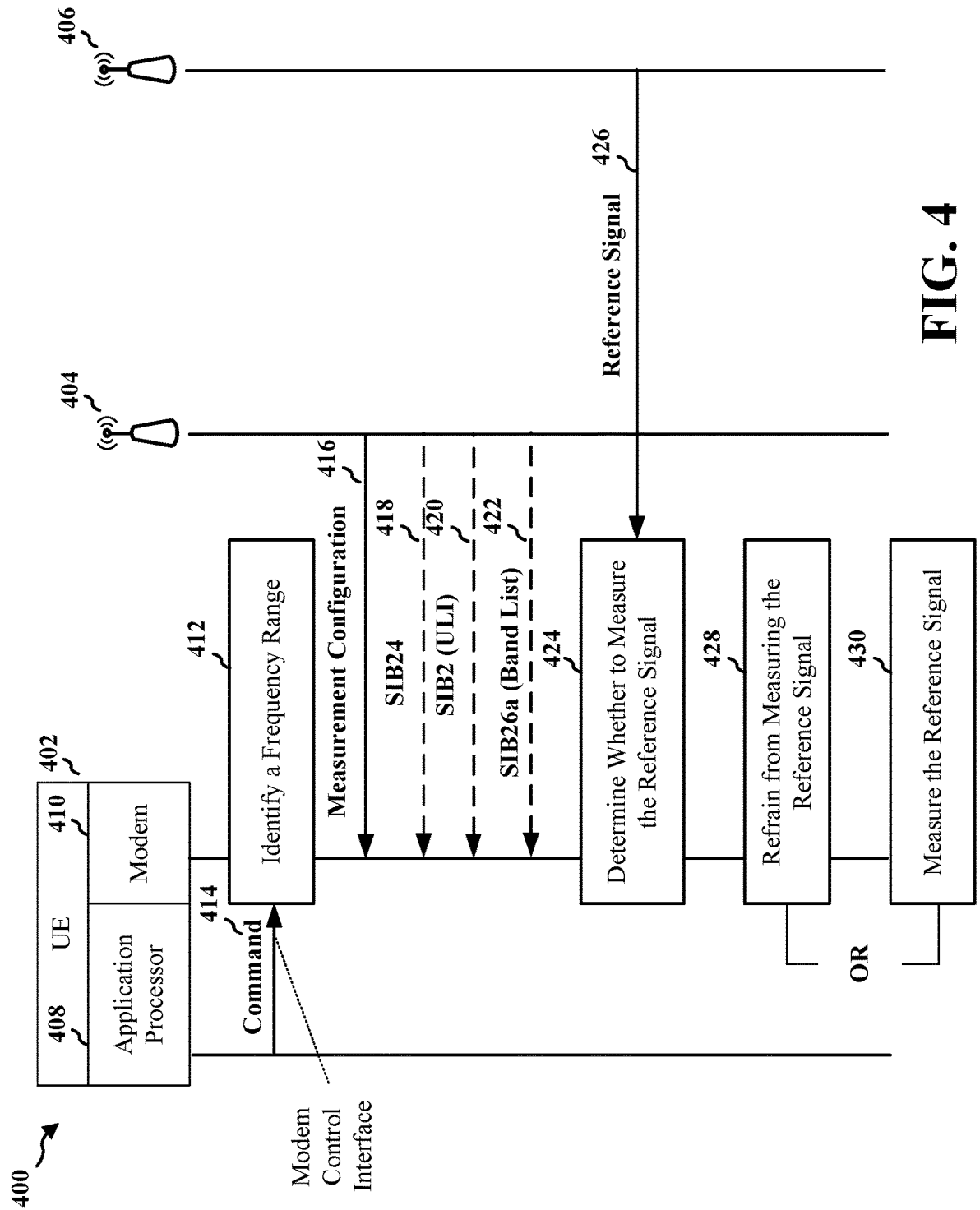
FIG. 4 is a diagram illustrating a call flow between a UE and a base station.

FIG. 4 is an example of a call flow 400 between a UE 402, a base station 404, and a base station 406. In this example, base station 404 may be an LTE base station in a source cell, and base station 406 may be a 5G base station in a neighbor cell. The UE 402 may include an application processor 408 and a modem 410. At 412, the UE identifies a frequency range (e.g. FR1 or FR2). For instance, the frequency range may be identified from a command 414 (e.g. a modem control interface command) provided by application processor 408 to modem 410. In one example, the command may indicate to the UE to prune measurement frequencies of reference signals carried within FR1. In another example, the command may indicate to the UE to prune FR1 frequencies of reference signals only from 5G SA base stations and only while the UE is in a connected mode. In another example, the command may indicate to the UE to prune measurement frequencies within other frequency ranges (e.g. FR2, FR3, etc.) of reference signals from 5G NSA base stations while the UE is in an idle or inactive mode. Other command indications may be received in other examples.

The UE 402 may receive a measurement configuration 416 from the base station 404. For example, the measurement configuration may include one or more measurement objects indicating the carrier frequencies of reference signals which the UE is to measure (e.g. SSB, CSI-RS, etc.). The measurement configuration may be received, for example, in an RRC reconfiguration message while the UE is in the connected mode. Additionally, the UE may receive a SIB24 418 from the base station 404 which indicates the carrier frequencies of reference signals in neighbor cells that the UE is to measure for inter-RAT cell reselection while in the idle mode. Moreover, the UE may receive a SIM 420 from the base station 404 which may include ULI depending on whether the base station 404 and base station 406 are connected in EN-DC. The UE may also receive a SIB26*a* 422 from the base station 404 which may indicate a list of supported frequency bands for EN-DC.

At 424, the UE 402 determines whether to measure a reference signal 426 from base station 406. For example, the reference signal 426 may be a SSB or CSI-RS from a 5G SA or NSA base station (e.g. base station 406). The reference signal 426 may be received at the UE within a configured frequency band (e.g. one of multiple bands within FR1, FR2, FR3, etc.). For instance, the frequency band of the reference signal 426 may be configured in measurement configuration 416 (or in some cases SIB24 418). When the UE determines whether to measure the reference signal at 424, the UE may check whether the reference signal is within a frequency range indicated in the command 414. For example, if the command 414 indicates to prune FR1 frequencies, the UE may determine not to measure the reference signal 426 if the configured frequency band of the reference signal is within FR1. Thus, at 428, the UE may refrain from measuring the reference signal. Alternatively, if the command 414 indicates to prune FR1 frequencies but the configured frequency band of the reference signal 426 is within FR2 (or some other frequency range than FR1), the UE may determine to measure the reference signal at 424. Thus, at 430, the UE may measure the reference signal. For instance, the UE may identify an RSRP, RSRQ, or SINR of the reference signal.

The UE may also determine whether to measure the reference signal at 424 based on whether the reference signal 426 is received when the UE is in a connected mode or an idle/inactive mode. For example, if the command 414 indicates to prune FR1 frequencies while the UE is in a connected mode only, the UE may determine not to measure the reference signal 426 if the configured frequency band of the reference signal is within FR1 and if the reference signal is received while the UE is in the connected mode. Thus, at 428, the UE may refrain from measuring the reference signal. Alternatively, if the command 414 indicates to prune FR1 frequencies while the UE is in the connected mode only but the reference signal 426 is received while the UE is in the idle or inactive mode, the UE may determine to measure the reference signal at 424. Thus, at 430, the UE may measure the reference signal.

The UE may also determine whether to measure the reference signal at 424 based on whether the base station 406 providing the reference signal 426 is a SA base station or a NSA base station. For example, if the command 414 indicates to prune FR1 frequencies from 5G SA base stations only, the UE may determine not to measure the reference signal 426 if the configured frequency band of the reference signal is within FR1 and if the reference signal is received from a SA base station. Thus, at 428, the UE may refrain from measuring the reference signal. Alternatively, if the command 414 indicates to prune FR1 frequencies from 5G SA base stations only but the reference signal 426 is received from a NSA base station, the UE may determine to measure the reference signal at 424. Thus, at 430, the UE may measure the reference signal.

The UE may further determine whether to measure the reference signal 426 at 424 based on whether the SIB2 420 includes ULI. For example, if the SIB2 does not include ULI, the UE may determine not to measure the reference signal 426 based on any one or more of the parameters of command 414 as described above. Thus, at 428, the UE may refrain from measuring the reference signal since such measurement may not be applicable to EN-DC. Alternatively, if the SIB2 includes ULI, then notwithstanding the configured parameters of command 414, the UE may determine to measure the reference signal 426. Thus, at 430, the UE may measure the reference signal since such measurement may be applicable to EN-DC.

The UE may further determine whether to measure the reference signal at 424 based on whether the reference signal 426 is within the list of supported bands in SIB26*a* 422. For instance, assume in one example that the SIB26*a* indicates frequency bands n1 (2110 MHz-2170 MHz downlink), n2 (1930 MHz-1990 MHz downlink), and n3 (1805 MHz-1880 MHz for downlink) as supported for EN-DC. In such case, if the UE determines that the reference signal 426 is not received in any of the indicated bands in SIB26*a* 422 (e.g. the UE determines at 424 that the reference signal 426 is not received in n1, n2, or n3), the UE may determine not to measure the reference signal 426 based on any one or more of the parameters of command 414 as described above. Thus, at 428, the UE may refrain from measuring the reference signal since such measurement may not be applicable to EN-DC. Alternatively, if the configured frequency band of the reference signal 426 is within one of the indicated bands in SIB26*a* 422 (e.g. the UE determines at 424 that the reference signal 426 is received in either n1, n2, or n3), then notwithstanding the configured parameters of command 414, the UE may determine to measure the reference signal 426. Thus, at 430, the UE may measure the reference signal since such measurement may be applicable to EN-DC.

Figure 5:
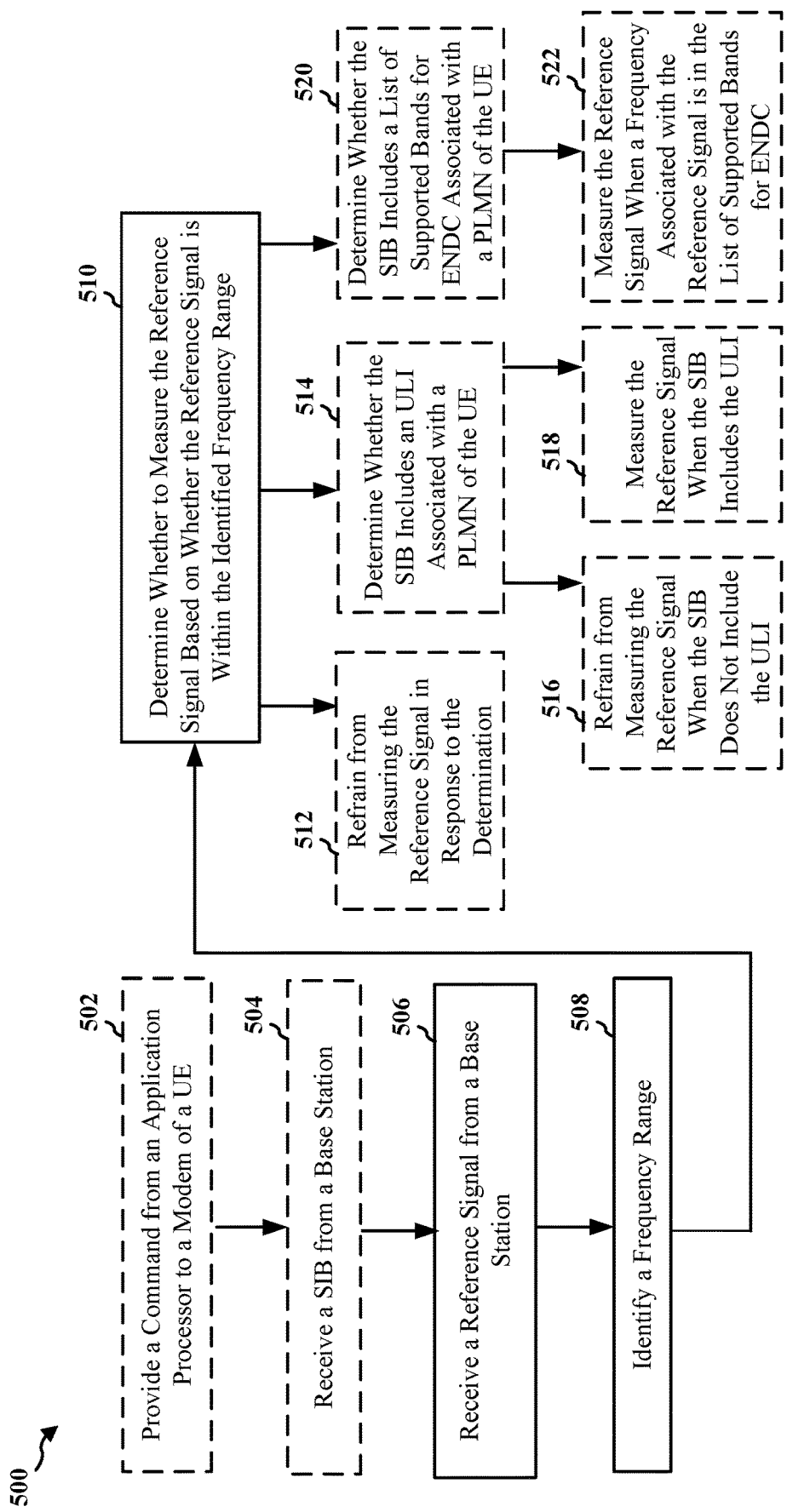
FIG. 5 is a flowchart of a method of wireless communication.

FIG. 5 is a flowchart 500 of a method of wireless communication. The method may be performed by a UE (e.g., the UE 104, 350, 402; the apparatus 602) in communication with a base station (e.g., the base station 102/180, 310). For example, the base station may be a 5G base station (e.g., base station 406). The UE may include an application processor (e.g. application processor 408, 606) and a modem (e.g. modem 410, cellular baseband processor 604) connected to the application processor over a modem control interface. Optional aspects are illustrated in dashed lines. The method allows a UE to disable measurements of reference signals from 5G base stations which are inapplicable to EN-DC, thereby preventing inter-RAT handovers to those base stations and saving UE power consumption.

At 502, the UE may provide a command from the application processor to the modem. For example, 502 may be performed by command component 640. For instance, referring to FIG. 4, the application processor 408 of UE 402 may provide command 414 to modem 410 of UE 402 over the modem control interface. The command 414 may indicate to the UE (e.g. the modem 410, controller/processor 359 or RX processor 356 of UE 350) to prune measurement frequencies of reference signals carried within a given frequency range (e.g. FR1, FR2, FR3, etc.), from a given type of base station (e.g. 5G SA or 5G NSA), or during a given type of UE mode (e.g. connected mode or idle/inactive mode). For example, command 414 may correspond to the prune NR measurement request described above.

At 504, the UE may receive a SIB from a second base station (e.g., an LTE base station). For example, 504 may be performed by SIB component 642. In one example, the SIB may be a SIB2. In another example, the SIB may be a SIB26a. For example, referring to FIG. 4, the UE 402 (e.g. the modem 410, controller/processor 359 or RX processor 356 of UE 350) may receive SIB2 420 or SIB26a 422 from base station 404. The UE 402 (e.g. the modem 410, controller/processor 359 or RX processor 356 of UE 350) may also receive SIB24 418 from base station 404.

At 506, the UE receives a reference signal from the base station (e.g., the 5G base station). For example, 506 may be performed by reference signal component 644. For example, referring to FIG. 4, the UE 402 (e.g. the modem 410, controller/processor 359 or RX processor 356 of UE 350) may receive reference signal 426 from base station 406. For instance, the reference signal may be a SSB or CSI-RS. The reference signal may be received within a frequency band which is configured in measurement configuration 416 or SIB24 418.

At 508, the UE identifies a frequency range. For example, 508 may be performed by frequency range component 646. The command provided at 502 may indicate the identified frequency range. In one example, the frequency range may be identified from one of two pre-defined frequency ranges. In another example, the frequency range may be identified from one of at least three pre-defined frequency ranges. For instance, referring to FIG. 4, at 412, the UE (e.g. the modem 410 or controller/processor 359 of UE 350) may identify a frequency range from one of two pre-defined frequency ranges (i.e. FR1 and FR2) or from one of at least three pre-defined frequency ranges (i.e. FR1, FR2, FR3, etc.). The frequency range may be identified from command 414. For instance, the command 414 may indicate to prune measurement frequencies of reference signals carried within one or more of FR1 frequencies, FR2 frequencies, FR3 frequencies, etc.

At 510, the UE determines whether to measure the reference signal based on whether the reference signal is within the identified frequency range. For example, 510 may be performed by determination component 648. The determination may be performed at the modem. For example, referring to FIG. 4, the UE 402 (e.g. the modem 410 or controller/processor 359 of UE 350, 402) may determine at 424 whether to measure reference signal 426 from base station 406 based on the identified frequency range in command 414. For instance, the UE may check whether the reference signal is within a frequency range indicated in the command 414. For example, if the command 414 indicates to prune FR1 frequencies, the UE may determine at 424 not to measure the reference signal if the configured frequency band of the reference signal (e.g., in measurement configuration 416) is within FR1 or if the reference signal is received within FR1. Alternatively, if the command 414 indicates to prune FR1 frequencies but the configured frequency band of the reference signal is within a different frequency range (e.g. FR2), the UE may determine to measure the reference signal.

The determination at 510 whether to measure the reference signal may be further based on whether the UE is in a connected mode, an idle mode, or an inactive mode. For example, referring to FIG. 4, the UE (e.g. the modem 410, controller/processor 359 or RX processor 356 of UE 350) may determine whether to measure the reference signal at 424 based on whether the reference signal 426 is received when the UE is in a connected mode or an idle or inactive mode. For example, if the command 414 indicates to prune specified frequencies while the UE is in a connected mode only, the UE may determine not to measure the reference signal 426 if the reference signal is received while the UE is in the connected mode. Alternatively, if the command 414 indicates to prune specified frequencies while the UE is in the connected mode only, but the reference signal 426 is received while the UE is in the idle or inactive mode, the UE may determine to measure the reference signal at 424.

The determination at 510 whether to measure the reference signal may be further based on whether the base station (e.g., the 5G base station) is SA or NSA. For example, referring to FIG. 4, the UE (e.g. the modem 410, controller/processor 359 or RX processor 356 of UE 350) may determine whether to measure the reference signal at 424 based on whether the base station 406 providing the reference signal 426 is a SA base station or a NSA base station. For example, if the command 414 indicates to prune specified frequencies from 5G SA base stations only, the UE may determine not to measure the reference signal 426 if base station 406 is an SA base station. Alternatively, if the command 414 indicates to prune specified frequencies from 5G SA base stations only, but base station 406 is a NSA base station, the UE may determine to measure the reference signal at 424.

At 512, the UE may refrain from measuring the reference signal in response to the determination at 510. For example, 512 may be performed by measurement component 650. For instance, referring to FIG. 4, at 428, the UE (e.g. the modem 410, controller/processor 359 or RX processor 356 of UE 350) may refrain from measuring the reference signal 426 if the UE determines at 424 not to measure the reference signal based on the identified frequency range in command 414, based on whether the UE is in a connected mode or an idle mode, or based on whether the base station (e.g., the 5G base station) is SA or NSA. For instance, the UE may not measure an RSRP, RSRQ, or SINR of the reference signal, and thus the UE may not send a measurement report based on such measurement to base station 404.

The determination at 510 may be further based on the SIB received at 504. In one example, at 514, the UE may determine whether the SIB includes an ULI associated with a PLMN of the UE. For example, 514 may be performed by the determination component 648. If the SIB does not include the ULI, at 516, the UE may refrain from measuring the reference signal. For example, 516 may be performed by the measurement component 650. If the SIB includes the ULI, at 518, the UE may measure the reference signal. For example, 518 may be performed by the measurement component 650. For instance, referring to FIG. 4, the UE 402 (e.g. the modem 410, controller/processor 359 or RX processor 356 of UE 350) may determine whether to measure the reference signal 426 at 424 based on whether the SIB2 420 includes ULI. For example, in response to the SIB2 not including ULI, the UE may determine not to measure the reference signal 426 based on any one or more of the parameters of command 414 as described above. Thus, at 428, the UE (e.g. the modem 410, controller/processor 359 or RX processor 356 of UE 350) may refrain from measuring the reference signal since such measurement may not be applicable to EN-DC. For instance, the UE may not measure an RSRP, RSRQ, or SINR of the reference signal, and thus the UE may not send a measurement report based on such measurement to base station 404. Alternatively, in response to the SIB2 including ULI, then notwithstanding the configured parameters of command 414, the UE (e.g. the modem 410, controller/processor 359 or RX processor 356 of UE 350) may determine to measure the reference signal 426. Thus, at 430, the UE (e.g. the modem 410, controller/processor 359 or RX processor 356 of UE 350) may measure the reference signal since such measurement may be applicable to EN-DC. For instance, the UE may measure an RSRP, RSRQ, or SINR of the reference signal, and thus the UE may send a measurement report based on such measurement to base station 404.

In another example, at 520, the UE may determine whether the SIB includes a list of supported bands for ENDC associated with a PLMN of the UE. For example, 520 may be performed by the determination component 648. In response to a frequency associated with the reference signal being in the list of supported bands for ENDC, at 522, the UE may measure the reference signal. For example, 522 may be performed by the measurement component 650. For instance, referring to FIG. 4, the UE 402 (e.g. the modem 410, controller/processor 359 or RX processor 356 of UE 350) may determine whether to measure the reference signal at 424 based on whether the reference signal 426 is within the list of supported bands in SIB26a 422. For instance, assume in one example that the SIB26a indicates frequency bands n1 (2110 MHz-2170 MHz downlink), n2 (1930 MHz-1990 MHz downlink), and n3 (1805 MHz-1880 MHz for downlink) as supported for EN-DC. In such case, if the UE determines that the reference signal 426 is not received in any of the indicated bands in SIB26a 422 (e.g. the UE determines at 424 that the reference signal 426 is not received in n1, n2, or n3), the UE may determine not to measure the reference signal 426 based on any one or more of the parameters of command 414 as described above. Thus, at 428, the UE (e.g. the modem 410, controller/processor 359 or RX processor 356 of UE 350) may refrain from measuring the reference signal since such measurement may not be applicable to EN-DC. For instance, the UE may not measure an RSRP, RSRQ, or SINR of the reference signal, and thus the UE may not send a measurement report based on such measurement to base station 404. Alternatively, if the configured frequency band of the reference signal 426 is within one of the indicated bands in SIB26a 422 (e.g. the UE determines at 424 that the reference signal 426 is received in either n1, n2, or n3), then notwithstanding the configured parameters of command 414, the UE may determine to measure the reference signal 426. Thus, at 430, the UE (e.g. the modem 410, controller/processor 359 or RX processor 356 of UE 350) may measure the reference signal since such measurement may be applicable to EN-DC. For instance, the UE may measure an RSRP, RSRQ, or SINR of the reference signal, and thus the UE may send a measurement report based on such measurement to base station 404.

Figure 6:
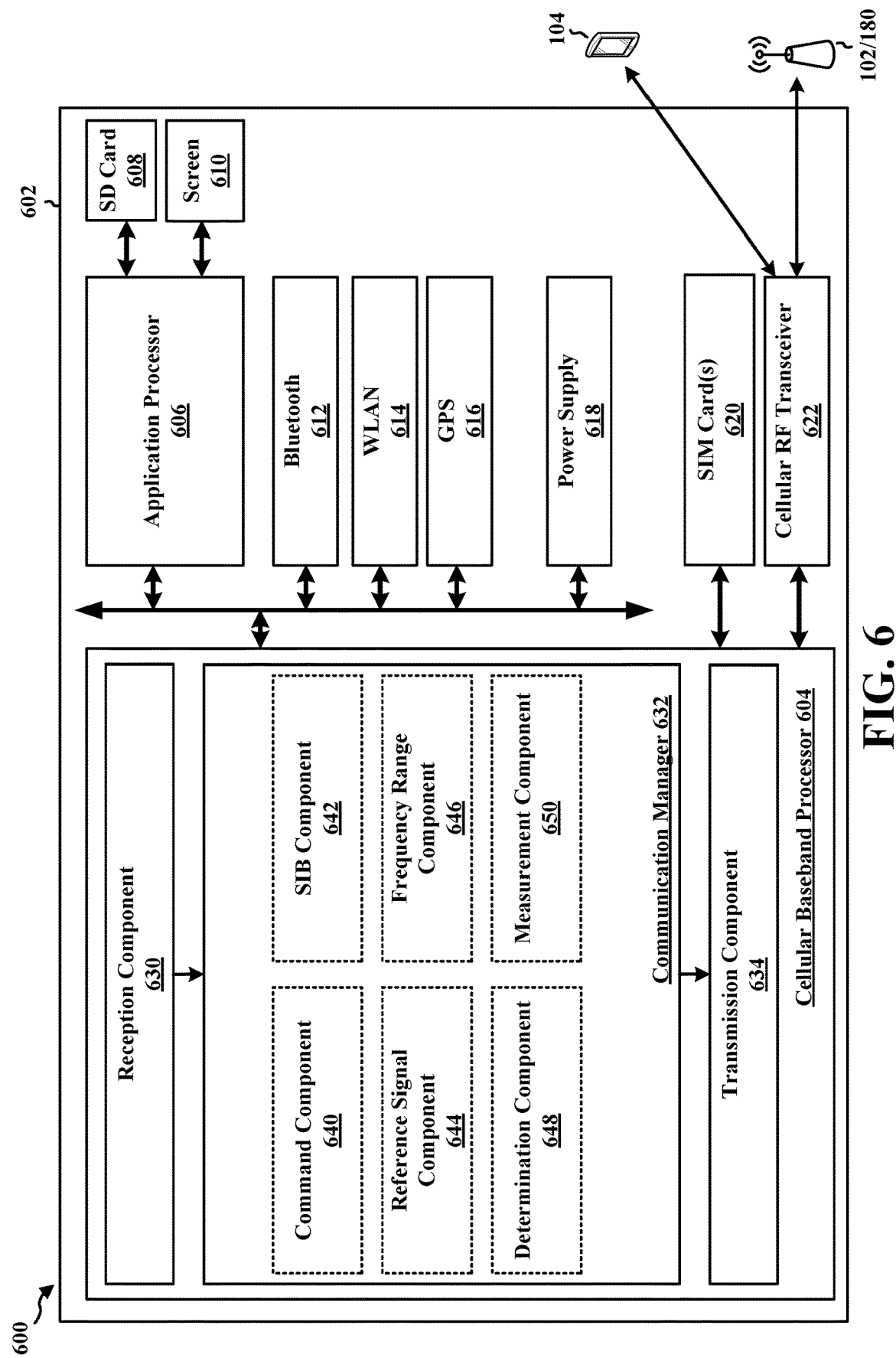
FIG. 6 is a diagram illustrating an example of a hardware implementation for an example apparatus.

FIG. 6 is a diagram 600 illustrating an example of a hardware implementation for an apparatus 602. The apparatus 602 is a UE and includes a cellular baseband processor 604 (also referred to as a modem) coupled to a cellular RF transceiver 622 and one or more subscriber identity modules (SIM) cards 620, an application processor 606 coupled to a secure digital (SD) card 608 and a screen 610, a Bluetooth module 612, a wireless local area network (WLAN) module 614, a Global Positioning System (GPS) module 616, and a power supply 618. The cellular baseband processor 604 communicates through the cellular RF transceiver 622 with the UE 104 and/or BS 102/180. The cellular baseband processor 604 may include a computer-readable medium/memory. The computer-readable medium/memory may be non-transitory. The cellular baseband processor 604 is responsible for general processing, including the execution of software stored on the computer-readable medium/memory. The software, when executed by the cellular baseband processor 604, causes the cellular baseband processor 604 to perform the various functions described supra. The computer-readable medium/memory may also be used for storing data that is manipulated by the cellular baseband processor 604 when executing software. The cellular baseband processor 604 further includes a reception component 630, a communication manager 632, and a transmission component 634. The communication manager 632 includes the one or more illustrated components. The components within the communication manager 632 may be stored in the computer-readable medium/memory and/or configured as hardware within the cellular baseband processor 604. The cellular baseband processor 604 may be a component of the UE 350 and may include the memory 360 and/or at least one of the TX processor 368, the RX processor 356, and the controller/processor 359. In one configuration, the apparatus 602 may be a modem chip and include just the baseband processor 604, and in another configuration, the apparatus 602 may be the entire UE (e.g., see 350 of FIG. 3) and include the aforediscussed additional modules of the apparatus 602.

The communication manager 632 includes a command component 640 that is configured to provide a command from the application processor 606 to the modem (e.g. the baseband processor 604), e.g., as described in connection with 502. The communication manager 632 further includes a SIB component 642 that is configured to receive a SIB from a second base station (e.g. an LTE base station), e.g., as described in connection with 504. The communication manager 632 further includes a reference signal component 644 that is configured to receive a reference signal from a base station (e.g. a 5G base station), e.g., as described in connection with 506. The communication manager 632 further includes a frequency range component 646 that receives input in the form of the command from the command component 640 and is configured to identify a frequency range, e.g., as described in connection with 508. The command may indicate the identified frequency range, e.g., as described in connection with 508.

The communication manager 632 further includes a determination component 648 that receives input in the form of the reference signal from the reference signal component 644 and the identified frequency range from the frequency range component 646 and is configured to determine whether to measure the reference signal based on whether the reference signal is within the identified frequency range, e.g., as described in connection with 510. The determination may be performed at the modem (e.g. baseband processor 604), e.g., as described in connection with 510. The determination may be further based on whether the UE is in a connected mode or an idle mode, e.g., as described in connection with 510. The determination may be further based on whether the base station is SA or NSA, e.g., as described in connection with 510.

The determination may be further based on the SIB received by SIB component 642, e.g., as described in connection with 510, 514 and 520. In one example, the determination component 648 is further configured to determine whether the SIB includes an ULI associated with a PLMN of the UE, e.g., as described in connection with 514. In another example, the determination component 648 is further configured to determine whether the SIB includes a list of supported bands for ENDC associated with a PLMN of the UE, e.g., as described in connection with 520.

The communication manager 632 further includes a measurement component 650 that receives input in the form of the determination from the determination component 648 and is configured to refrain from measuring the reference signal in response to the determination, e.g., as described in connection with 512. The measurement component 650 may further receive input in the form of the SIB from SIB component 642 and is further configured to refrain from measuring the reference signal when the SIB does not include the ULI, e.g., as described in connection with 516, and to measure the reference signal when the SIB includes the ULI, e.g., as described in connection with 518. The measurement component 650 is further configured to measure the reference signal when a frequency associated with the reference signal is in the list of supported bands for ENDC, e.g., as described in connection with 522.

The apparatus may include additional components that perform each of the blocks of the algorithm in the aforementioned flowcharts of FIGS. 4 and 5. As such, each block in the aforementioned flowcharts of FIGS. 4 and 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 602, and in particular the cellular baseband processor 604, includes means for receiving a reference signal from a base station, means for identifying a frequency range, and means for determining whether to measure the reference signal based on whether the reference signal is within the identified frequency range. In one configuration, the frequency range may be identified from one of two pre-defined frequency ranges. In one configuration, the frequency range may be identified from one of at least three pre-defined frequency ranges. In one configuration, the determining whether to measure the reference signal may be further based on whether the UE is in a connected mode or an idle mode. In one configuration, the determining whether to measure the reference signal may be further based on whether the base station is SA or NSA.

In one configuration, the apparatus 602, and in particular the cellular baseband processor 604, may include means for refraining from measuring the reference signal in response to the determination.

In one configuration, the apparatus 602, and in particular the cellular baseband processor 604, may include means for providing a command from the application processor to the modem, where the command indicates the identified frequency range, and where the determining is performed at the modem.

In one configuration, the means for receiving may be further configured to receive a SIB from a second base station, where the determining may be further based on the SIB.

In one configuration, the SIB may be a SIB2. In one configuration, the means for determining may be further configured to determine whether the SIB includes an ULI associated with a PLMN of the UE. In one configuration, the apparatus 602, and in particular the cellular baseband processor 604, may include means for refraining from measuring the reference signal when the SIB does not include the ULI. In one configuration, the apparatus 602, and in particular the cellular baseband processor 604, may include means for measuring the reference signal when the SIB includes the ULI.

In one configuration, the SIB may be a SIB26a. In one configuration, the means for determining may be further configured to determine whether the SIB includes a list of supported bands for ENDC associated with a PLMN of the UE. In one configuration, the apparatus 602, and in particular the cellular baseband processor 604, may include means for measuring the reference signal when a frequency associated with the reference signal is in the list of supported bands for ENDC.

The aforementioned means may be one or more of the aforementioned components of the apparatus 602 configured to perform the functions recited by the aforementioned means. As described supra, the apparatus 602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Thus, aspects of the present disclosure allow UEs to avoid handovers from LTE base stations to 5G base stations while in a connected mode, or to reselect the cell of a 5G base station while in an idle mode, thereby saving UE power consumption while maintaining support for EN-DC. With EN-DC, the UE may set up dual connectivity with an LTE base station and a 5G NSA base station based on dynamic traffic demands, if the benefits of reduced latency, improved traffic capacity and increased data throughput of 5G/NR are desired, and to release the 5G NSA base station from connectivity if power consumption savings is desired. This advantage provides power savings flexibility over deployments where the UE is handed over to 5G SA base stations with high UE power consumption, as network operators may deploy 5G base stations in SA and NSA modes.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving a reference signal from a base station; identifying a frequency range; and determining whether to measure the reference signal based on whether the reference signal is within the identified frequency range.

Example 2 is the method of Example 1, wherein the frequency range is identified from one of two pre-defined frequency ranges.

Example 3 is the method of Example 1, wherein the frequency range is identified from one of at least three pre-defined frequency ranges.

Example 4 is the method of any of Examples 1 to 3, further comprising: refraining from measuring the reference signal in response to the determination.

Example 5 is the method of any of Examples 1 to 4, wherein the UE includes an application processor and a modem connected to the application processor, the method further comprising: providing a command from the application processor to the modem, wherein the command indicates the identified frequency range; wherein the determining is performed at the modem.

Example 6 is the method of any of Examples 1 to 5, wherein the determining whether to measure the reference signal is further based on whether the UE is in a connected mode, an idle mode, or an inactive mode.

Example 7 is the method of any of Examples 1 to 6, wherein the determining whether to measure the reference signal is further based on whether the base station is stand-alone (SA) or non-standalone (NSA).

Example 8 is the method of any of Examples 1 to 7, further comprising receiving a system information block (SIB) from a second base station, wherein the determining is further based on the SIB.

Example 9 is the method of Example 8, wherein the SIB is a system information block 2 (SIB2).

Example 10 is the method of Example 8 or 9, further comprising determining whether the SIB includes an upper layer indication (ULI) associated with a Public Land Mobile Network (PLMN) of the UE.

Example 11 is the method of Example 10, further comprising refraining from measuring the reference signal in response to the SIB not including the ULI.

Example 12 is the method of Example 10, further comprising measuring the reference signal in response to the SIB including the ULI.

Example 13 is the method of Example 8, further comprising determining whether the SIB includes a list of supported bands for Evolved-Universal Terrestrial Radio Access (EUTRA) New Radio (NR) Dual Connectivity (ENDC) associated with a Public Land Mobile Network (PLMN) of the UE.

Example 14 is the method of Example 13, wherein the SIB is a system information block 26a (SIB26a).

Example 15 is the method of Example 13 or 14, further comprising measuring the reference signal in response to a frequency associated with the reference signal being in the list of supported bands for ENDC.

Example 16 is an apparatus for wireless communication, comprising: a processor; memory coupled with the processor; and instructions stored in the memory and operable, when executed by the processor, to cause the apparatus to: receive a reference signal from a base station; identify a frequency range; and determine whether to measure the reference signal based on whether the reference signal is within the identified frequency range.

Example 17 is the apparatus of Example 16, wherein the frequency range is identified from one of two pre-defined frequency ranges.

Example 18 is the apparatus of Example 16, wherein the frequency range is identified from one of at least three pre-defined frequency ranges.

Example 19 is the apparatus of any of Examples 16 to 18, wherein the instructions, when executed by the processor, further cause the apparatus to refrain from measuring the reference signal in response to the determination.

Example 20 is the apparatus of any of Examples 16 to 19, wherein the apparatus further comprises an application processor connected to the processor, wherein a command is provided from the application processor to the processor, and wherein the command indicates the identified frequency range.

Example 21 is the apparatus of any of Examples 16 to 20, wherein the determining whether to measure the reference signal is further based on whether the apparatus is in a connected mode, an idle mode, or an inactive mode.

Example 22 is the apparatus of any of Examples 16 to 21, wherein the determining whether to measure the reference signal is further based on whether the base station is stand-alone (SA) or non-standalone (NSA).

Example 23 is the apparatus of any of Examples 16 to 22, wherein the instructions, when executed by the processor, further cause the apparatus to receive a system information block (SIB) from a second base station, wherein the determining is further based on the SIB.

Example 24 is the apparatus of Example 23, wherein the SIB is a system information block 2 (SIB2).

Example 25 is the apparatus of Example 23 or 24, wherein the instructions, when executed by the processor, further cause the apparatus to determine whether the SIB includes an upper layer indication (ULI) associated with a Public Land Mobile Network (PLMN) of the apparatus.

Example 26 is the apparatus of Example 25, wherein the instructions, when executed by the processor, further cause the apparatus to refrain from measuring the reference signal in response to the SIB not including the ULI.

Example 27 is the apparatus of Example 25, wherein the instructions, when executed by the processor, further cause the apparatus to measure the reference signal in response to the SIB including the ULI.

Example 28 is the apparatus of Example 23, wherein the instructions, when executed by the processor, further cause the apparatus to determine whether the SIB includes a list of supported bands for Evolved-Universal Terrestrial Radio Access (EUTRA) New Radio (NR) Dual Connectivity (ENDC) associated with a Public Land Mobile Network (PLMN) of the apparatus.

Example 29 is the apparatus of Example 28, wherein the SIB is a system information block 26a (SIB26a).

Example 30 is the apparatus of Example 28 or 29, wherein the instructions, when executed by the processor, further cause the apparatus to measure the reference signal in response to a frequency associated with the reference signal being in the list of supported bands for ENDC.

Example 31 is an apparatus for wireless communication, comprising: means for receiving a reference signal from a base station; means for identifying a frequency range; and means for determining whether to measure the reference signal based on whether the reference signal is within the identified frequency range.

Example 32 is the apparatus of Example 31, further comprising: means for refraining from measuring the reference signal in response to the determination.

Example 33 is the apparatus of Example 31 or 32, wherein the apparatus further comprises an application processor and a modem connected to the application processor, the apparatus further comprising: means for providing a command from the application processor to the modem, wherein the command indicates the identified frequency range; wherein the determining is performed at the modem.

Example 34 is the apparatus of any of Examples 31 to 33, wherein the means for receiving is further configured to receive a system information block (SIB) from a second base station, wherein the determining is further based on the SIB.

Example 35 is the apparatus of Example 34, wherein the means for determining is further configured to determine whether the SIB includes an upper layer indication (ULI) associated with a Public Land Mobile Network (PLMN) of the apparatus.

Example 36 is the apparatus of Example 35, further comprising means for refraining from measuring the reference signal in response to the SIB not including the ULI.

Example 37 is the apparatus of Example 35, further comprising means for measuring the reference signal in response to the SIB including the ULI.

Example 38 is the apparatus of Example 34, wherein the means for determining is further configured to determine whether the SIB includes a list of supported bands for Evolved-Universal Terrestrial Radio Access (EUTRA) New Radio (NR) Dual Connectivity (ENDC) associated with a Public Land Mobile Network (PLMN) of the apparatus.

Example 39 is the apparatus of Example 38, further comprising means for measuring the reference signal in response to a frequency associated with the reference signal being in the list of supported bands for ENDC.

Example 40 is a computer-readable medium storing computer executable code, the code when executed by a processor cause the processor to: receive a reference signal from a base station; identify a frequency range; and determine whether to measure the reference signal based on whether the reference signal is within the identified frequency range.

What is claimed is:

1. A method of wireless communication at a user equipment (UE), comprising:
   receiving a reference signal from a base station;
   identifying a frequency range; and
   determining whether to measure the reference signal based on whether the reference signal is within the identified frequency range and further based on whether the base station is standalone (SA) or non-standalone (NSA).

2. The method of claim 1, wherein the frequency range is identified from one of two pre-defined frequency ranges.

3. The method of claim 1, wherein the frequency range is identified from one of at least three pre-defined frequency ranges.

4. The method of claim 1, further comprising:
   refraining from measuring the reference signal in response to the determination.

5. The method of claim 1, wherein the UE includes an application processor and a modem connected to the application processor via an interface, and
   wherein the determining is performed based on a command triggered over the interface in response to a user input at the UE.

6. The method of claim 1, wherein the determining whether to measure the reference signal is further based on whether the UE is in a connected mode, an idle mode, or an inactive mode.

7. The method of claim 1, further comprising receiving a system information block (SIB) from a second base station, wherein the determining is further based on the SIB.

8. The method of claim 7, wherein the SIB is a system information block 2 (SIB2).

9. The method of claim 7, further comprising determining whether the SIB includes an upper layer indication (ULI) associated with a Public Land Mobile Network (PLMN) of the UE.

10. The method of claim 9, further comprising refraining from measuring the reference signal in response to the SIB not including the ULI.

11. The method of claim 9, further comprising measuring the reference signal in response to the SIB including the ULI.

12. The method of claim 7, further comprising determining whether the SIB includes a list of supported bands for Evolved-Universal Terrestrial Radio Access (EUTRA) New Radio (NR) Dual Connectivity (ENDC) associated with a Public Land Mobile Network (PLMN) of the UE.

13. The method of claim 12, wherein the SIB is a system information block 26a (SIB26a).

14. The method of claim 12, further comprising measuring the reference signal in response to a frequency associated with the reference signal being in the list of supported bands for ENDC.

15. An apparatus for wireless communication, comprising:
   a processor;
   memory coupled with the processor; and
   instructions stored in the memory and operable, when executed by the processor, to cause the apparatus to:
      receive a reference signal from a base station;
      identify a frequency range; and
      determine whether to measure the reference signal based on whether the reference signal is within the identified frequency range and further based on whether the base station is standalone (SA) or non-standalone (NSA).

16. The apparatus of claim 15, wherein the instructions, when executed by the processor, further cause the apparatus to refrain from measuring the reference signal in response to the determination.

17. The apparatus of claim 15, wherein the determining whether to measure the reference signal is further based on whether the apparatus is in a connected mode, an idle mode, or an inactive mode.

18. The apparatus of claim 15, wherein the instructions, when executed by the processor, further cause the apparatus to receive a system information block (SIB) from a second base station, wherein the determining is further based on the SIB.

19. The apparatus of claim 18, wherein the instructions, when executed by the processor, further cause the apparatus to determine whether the SIB includes an upper layer indication (ULI) associated with a Public Land Mobile Network (PLMN) of the apparatus, to refrain from measuring the reference signal in response to the SIB not including the ULI, and to measure the reference signal in response to the SIB including the ULI.

20. The apparatus of claim 18, wherein the instructions, when executed by the processor, further cause the apparatus to determine whether the SIB includes a list of supported bands for Evolved-Universal Terrestrial Radio Access (EUTRA) New Radio (NR) Dual Connectivity (ENDC) associated with a Public Land Mobile Network (PLMN) of the apparatus.

21. The apparatus of claim 20, wherein the instructions, when executed by the processor, further cause the apparatus to measure the reference signal in response to a frequency associated with the reference signal being in the list of supported bands for ENDC.

22. An apparatus for wireless communication, comprising:
means for receiving a reference signal from a base station;
means for identifying a frequency range; and
means for determining whether to measure the reference signal based on whether the reference signal is within the identified frequency range and further based on whether the base station is standalone (SA) or non-standalone (NSA).

23. The apparatus of claim 22, further comprising:
means for refraining from measuring the reference signal in response to the determination.

24. The apparatus of claim 22, wherein the means for receiving is further configured to receive a system information block (SIB) from a second base station, wherein the determining is further based on the SIB.

25. The apparatus of claim 24, wherein the means for determining is further configured to determine whether the SIB includes an upper layer indication (ULI) associated with a Public Land Mobile Network (PLMN) of the apparatus, and the apparatus further comprises:
means for refraining from measuring the reference signal in response to the SIB not including the ULI; and
means for measuring the reference signal in response to the SIB including the ULI.

26. The apparatus of claim 24, wherein the means for determining is further configured to determine whether the SIB includes a list of supported bands for Evolved-Universal Terrestrial Radio Access (EUTRA) New Radio (NR) Dual Connectivity (ENDC) associated with a Public Land Mobile Network (PLMN) of the apparatus.

27. The apparatus of claim 26, further comprising means for measuring the reference signal in response to a frequency associated with the reference signal being in the list of supported bands for ENDC.

28. A non-transitory computer-readable medium storing computer executable code, the code when executed by a processor cause the processor to:
receive a reference signal from a base station;
identify a frequency range; and
determine whether to measure the reference signal based on whether the reference signal is within the identified frequency range and further based on whether the base station is standalone (SA) or non-standalone (NSA).

* * * * *